United States

Ikeda

4,145,116

Mar. 20, 1979

[54] LARGE APERTURE ULTRA WIDE ANGLE PHOTOGRAPHIC LENS SYSTEM

[75] Inventor: Yoshitsugi Ikeda, Hachiouji, Japan

[73] Assignee: Olympus Optical Co., Ltd., Tokyo, Japan

[21] Appl. No.: 790,751

[22] Filed: Apr. 25, 1977

[30] Foreign Application Priority Data

Apr. 27, 1976 [JP] Japan .................. 51-47289

[51] Int. Cl.$^2$ ............................. G02B 13/04
[52] U.S. Cl. .................................. 350/214
[58] Field of Search .......................... 350/214

[56] References Cited

U.S. PATENT DOCUMENTS

| | | | |
|---|---|---|---|
| 3,976,365 | 8/1976 | Nakagawa | 350/214 |
| 3,976,366 | 8/1976 | Yamashita | 350/214 |
| 4,029,397 | 6/1977 | Yamashita | 350/214 |

*Primary Examiner*—Conrad J. Clark
*Attorney, Agent, or Firm*—Cushman, Darby & Cushman

[57] ABSTRACT

A large-aperture ultra-wide angle photographic lens system which have such a small lens diameter as to be compatible with filters designed for use with other lens systems and wherein various aberrations are favorably corrected.

3 Claims, 5 Drawing Figures

LARGE APERTURE ULTRA WIDE ANGLE PHOTOGRAPHIC LENS SYSTEM

BACKGROUND OF THE INVENTION (a) Field of the Invention

The present invention relates to an ultra-wide angle photographic lens system having a long back focal length.

(b) Description of the Prior Art

Most of conventional ultra-wide angle photographic lens systems use front diverging lens groups having large aperture sizes for admitting incident rays at large angles. Further, ultra-wide angle lens systems require special filters having large aperture sizes since such lens systems are designed for large angles of incidence and filters must have diameters larger than those of the front diverging lens groups.

SUMMARY OF THE INVENTION

A general object of the present invention is to provide an ultra-wide angle photographic lens system having a field angle of 90° or wider, an aperture ratio of 1:2 and being compatible with filters having small diameters designed for use with other lens systems.

The lens system according to the present invention has such a composition as shown in FIG. 1, and consists of a front diverging lens group L1, a front converging lens group L2 and a rear converging lens group L3. Said front diverging lens group has a function to diverge paraxial rays 1 to obtain a long back focal length. After passing through the front diverging lens group L1, said paraxial rays 1 are converged and aberrations are corrected by said front converging lens group L2 and rear converging lens group L3, whereafter said paraxial rays form an image on the image plane. It is therefore necessary to impart a strong diverging power to said front diverging lens group L1 for obtaining a long back focal length especially in an ultra-wide angle lens system. In order to impart a strong diverging power to the front diverging lens group as described above, it is impossible to consist said front diverging lens group of a single lens element since it must have too small a radius of curvature. It is therefore obliged to compose said front diverging lens group of plural lens elements, and the lens system according to the present invention comprises a front diverging lens group which consists of a positive meniscus lens element having a convex surface on the object side and two negative meniscus lens elements.

Though it is necessary to impart a strong diverging power to said front diverging lens group L1 as is described above, offaxial rays 1' will also be remarkably diverged if said diverging power is too strong. In such a case, it will be obliged to dispose a stop at position S on the rear of the lens system and displace the entrance pupil to a position far from the first surface of the lens system, whereby the offaxial rays 1' will pass higher portion of the first surface of the lens system and a front diverging lens group having a large diameter is required. This requirement is opposed to the object of the present invention to provide a compact lens system.

In view of the foregoing descriptions, a certain definite conditions must be satisfied to compose a front diverging lens group. In the second place, the front converging lens group L2 has a function to give a definite degree of converging action to the paraxial rays 1 and offaxial rays 1' which are diverged by the front diverging lens group and then make said rays incident on the rear converging lens group L3. If this function of said front converging lens group L2 is too weak, it will be necessary to impart a stronger converging power to the rear converging lens group L3 and, in addition, the converging action for the offaxial rays 1' will be too weak, thereby making it necessary to displace the stop position S rearward.

By the way, contriving in such a way that the paraxial rays 1 emerging from the front converging lens group L2 will travel nearly in parallel with the optical axis will be advantageous for equipping the rear converging lens group L3 with a mechanism for correcting aberrations in photographing objects at short distance.

In the photographic lens system according to the present invention, used as said front converging lens group are a composite lens component consisting of two lens elements having a low refractive power and a cemented lens component having high refractive power. Furthermore, the rear converging lens group functions to exercise converging action to the paraxial rays 1 and offaxial rays 1' for favourably forming an image, and it is required, especially for a large-aperture wide-angle lens system, to compose said rear converging lens group at least of three lens components.

For the reasons described in the foregoing, the photographic lens system according to the present invention comprises a front diverging lens group comprising a first positive meniscus lens component, a second negative meniscus lens component and a third negative meniscus lens component, a front converging lens group comprising a fourth lens components composed of two positive lens elements having a low refractive power and a fifth positive cemented lens component, and a rear converging lens group comprising a sixth negative meniscus lens component, a seventh positive meniscus lens component and an eighth positive lens component. Said lens system satisfies the following conditions:

$$5 < r2/r3 < 7 \tag{1}$$

$$0.05 < r6/r7 < 0.2 \tag{2}$$

$$|r13/r14| < 0.2, r13 < 0 \tag{3}$$

$$1.5f < D < 1.7f \tag{4}$$

$$|n8 - n9| < 0.15, n9 > n8 \tag{5}$$

wherein the reference symbols represent as defined below: $r2$, $r3$, $r6$, $r7$, $r13$, $r14$: radii of curvature on the image side surface of said first lens component, the object side surface of said second lens component, the image side surface of said third lens component, the object side surface of said fourth lens component, the image side surface of said fifth lens component and the object side surface of said sixth lens component D: distance as measured from the first surface of said lens system to the image side surface of said fifth lens component $n8$, $n9$: refractive indices of both the lens elements of said sixth lens component Now, the significance of the afore-mentioned conditions will be described consecutively below:

Of the conditions enumerated above, the condition (1) is effective for correcting the offaxial rays passing through circumferential portions of said lens components. Although $r2/r3$ larger or smaller than the upper or lower limit of the condition (1) scarcely affects the paraxial rays, $r2/r3$ smaller than the lower limit will make it impossible to correct distortion. When $r2/r3$ is larger than the upper limit, in contrast, it will be impossible to favourably correct astigmatism. When r6/r7 is smaller than the lower limit of the condition (2), the offaxial rays emerging from the front diverging lens group L1 will be diverged too strongly to cause the defect already described above and, in addition, it will be difficult to correct coma. If r6/r7 exceeds the upper limit of the condition (2), diverging action will be too weak for the paraxial rays, thereby making it impossible to prolong the back focal length. When the condition (2) is not satisfied as described above, it will therefore be impossible to select an adequate composition for said front diverging lens group. When r13/r14 deviates from the range defined by the condition (3), coma will be aggravated. When r13 is larger than 0 (r13 > 0), the converging action for the paraxial rays emerging from said front lens groups will be too weak, thereby making it necessary to enhance the refractive power of said rear converging lens group. When refractive power is enhanced for the rear converging lens group as described above, on the other hand, the converging action will be too strong for the offaxial rays since said rays are scarcely influenced by the surface r13 which is located near the stop. If the front lens group has a length larger than the upper limit of the condition (4), the stop must be displaced rearward, thereby requiring, as decribed above, to enlarge the front diverging lens group contrary to the object of the present invention. If the length D of the front lens group is shorter than the the lower limit of the condition (4), in contrast, it will be impossible to reserve an airspace required for inserting a lens holder ring. When |n8 - n9| deviates from the range defined by the condition (5), zonal aberration will be aggravated. If n9 is smaller than n8 (n9 < n8), it will be difficult to favourably correct offaxial sperical aberration. It is therefore necessary to satisfy the condition of n9 > n8. For such an ultra-wide angle lens system as is provided by the present invention, it is unavoidable that aberrations and especially curvature of field are aggravated as distance to the object to be photographed is varied.

Therefore, the lens system according to the present invention has such a composition that the paraxial rays emerging from the front converging lens group will be nearly in parallel with the optical axis, thereby making it possible to correct aberrations in photographing objects at short distance. That is to say, said lens system makes it possible to correct curvature of field by displacing along the optical axis the lens components arranged between the last surface of the front converging lens group L2 and the image side surface of the seventh lens component in the rear converging lens group, while the final eighth lens component kept fixed at a definite position. Adequate dispacement for such a purpose will be approximately 7M when photographic magnification is taken as Mx.

DESCRIPTION OF THE PREFERRED EMBODIMENTS

Figure 1:
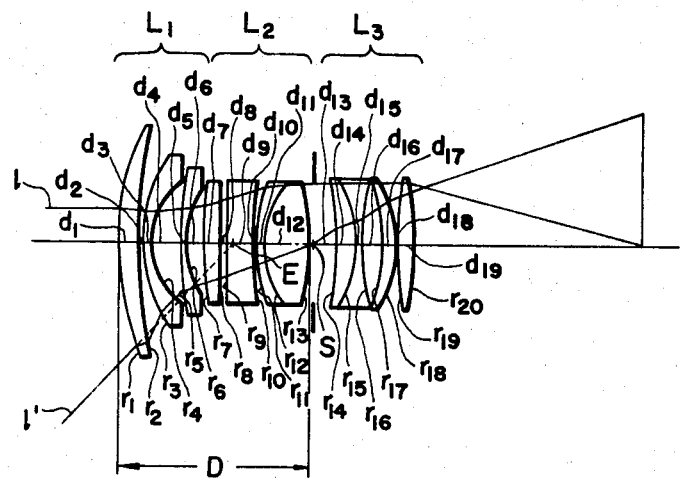
FIG. 1 shows a sectional view illustrating the composition of the lens system according to the present invention.
Figure 2:
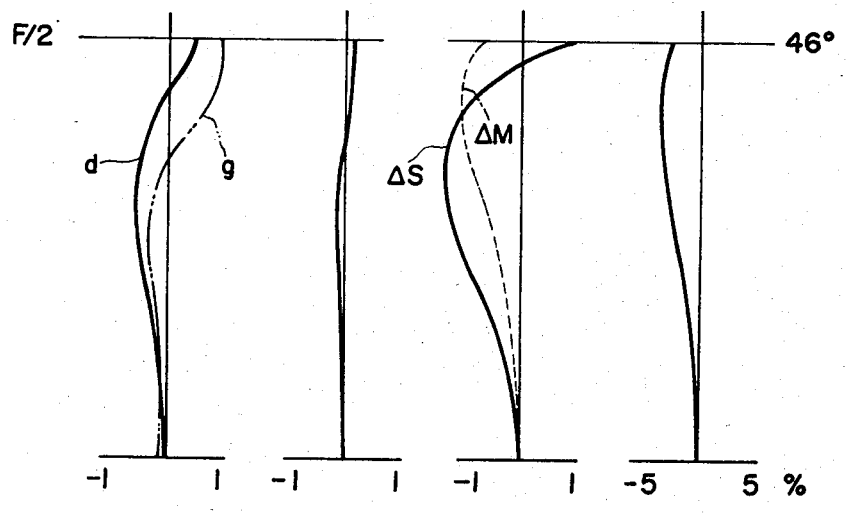
FIG. 2 show curves illustrating the aberration characteristics of the Embodiment 1.
Figure 3:
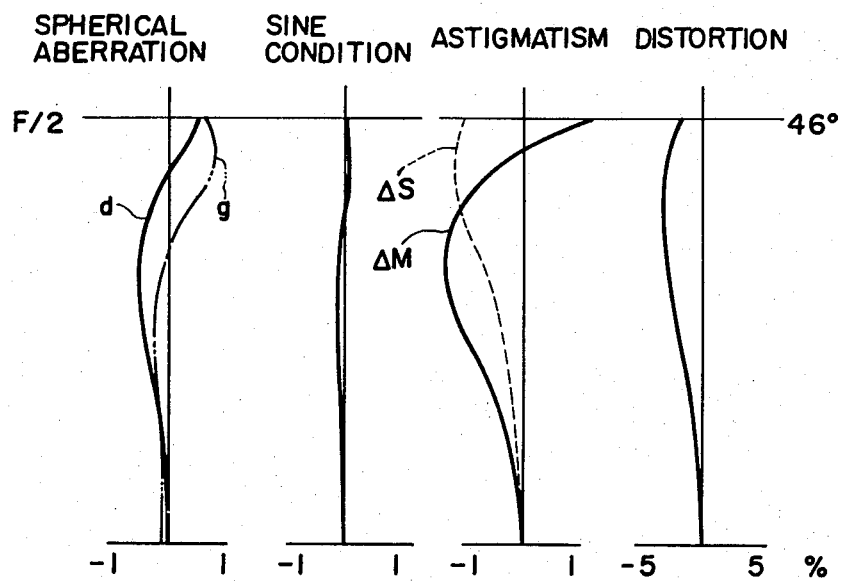
FIG. 3 shows graphs illustrating the aberration characteristics of the Embodiment 2.
Figure 4:
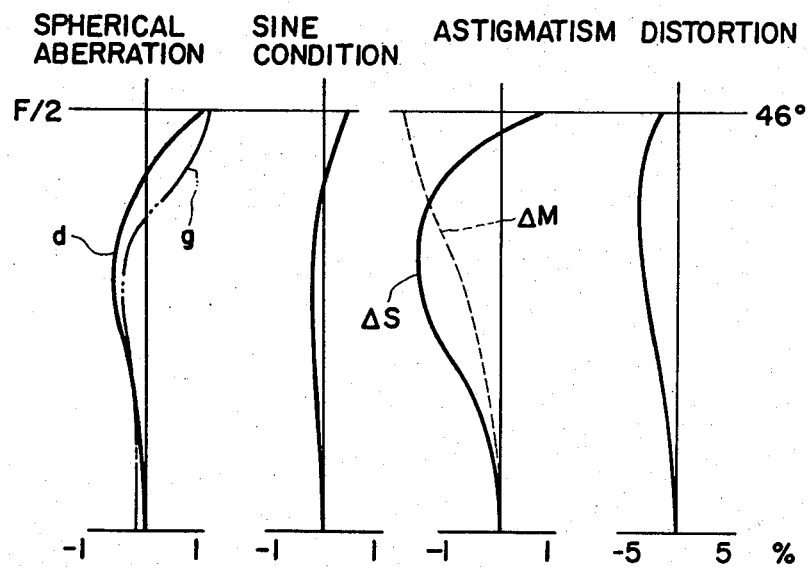
FIg. 4 illustrates graphs showing the aberration characteristics of the Embodiment 3.

Now, some preferred embodiments of the present invention will be detailedly described below:

Embodiment 1:

| $f = 100\ F/2$ | | Field Angle 92° | B.f. = 177.3 |
|---|---|---|---|
| $r1 = 205.76$ | $d1 = 18.60$ | $n1 = 1.6393$ | $\nu1 = 44.9$ |
| $r2 = 529.22$ | $d2 = 0.60$ | | |
| $r3 = 101.55$ | $d3 = 6.28$ | $n2 = 1.734$ | $\nu2 = 51.5$ |
| $r4 = 53.00$ | $d4 = 23.26$ | | |
| $r5 = 228.01$ | $d5 = 5.63$ | $n3 = 1.7725$ | $\nu3 = 49.6$ |
| $r6 = 62.26$ | $d6 = 10.70$ | | |
| $r7 = 640.49$ | $d7 = 15.86$ | $n4 = 1.61659$ | $\nu4 = 36.6$ |
| $r8 = \infty$ | $d8 = 3.26$ | | |
| $r9 = \infty$ | $d9 = 23.26$ | $n5 = 1.61659$ | $\nu5 = 36.6$ |
| $r10 = -2015.4$ | $d10 = 0.47$ | | |
| $r11 = 110.68$ | $d11 = 6.98$ | $n6 = 1.6968$ | $\nu6 = 55.5$ |
| $r12 = 68.42$ | $d12 = 36.28$ | $n7 = 1.5934$ | $\nu7 = 34.8$ |
| $r13 = -170.22$ | $d13 = 17.67$ | | |
| $r14 = -1046.6$ | $d14 = 17.58$ | $n8 = 1.72$ | $\nu8 = 43.7$ |
| $r15 = -88.37$ | $d15 = 6.98$ | $n9 = 1.84666$ | $\nu9 = 23.9$ |
| $r16 = 212.49$ | $d16 = 10.00$ | | |
| $r17 = -232.53$ | $d17 = 13.95$ | $n10 = 1.713$ | $\nu10 = 53.9$ |
| $r18 = -88.07$ | $d18 = 0.47$ | | |
| $r19 = 459.97$ | $d19 = 13.95$ | $n11 = 1.72$ | $\nu11 = 50.3$ |
| $r20 = -199.85$ | | | |
| $r2/r3 = 5.21$ | $D = 151.2$ | $r6/r7 = 0.097$ | |
| $n8 - n9 = 0.127$ | $r13/r14 = 0.163$ | | |

Embodiment 2:

| $f = 100\ F/2$ | | Field Angle 92° | B.f. = 176.9 |
|---|---|---|---|
| $r1 = 235.55$ | $d1 = 18.72$ | $n1 = 1.6393$ | $\nu1 = 44.9$ |
| $r2 = 678.36$ | $d2 = 0.72$ | | |
| $r3 = 102.51$ | $d3 = 6.35$ | $n2 = 1.734$ | $\nu2 = 51.5$ |
| $r4 = 55.04$ | $d4 = 23.35$ | | |
| $r5 = 234.03$ | $d5 = 5.72$ | $n3 = 1.7725$ | $\nu3 = 49.6$ |
| $r6 = 60.56$ | $d6 = 10.33$ | | |
| $r7 = 792.61$ | $d7 = 16.36$ | $n4 = 1.61659$ | $\nu4 = 36.6$ |
| $r8 = \infty$ | $d8 = 3.33$ | | |
| $r9 = \infty$ | $d9 = 23.34$ | $n5 = 1.61659$ | $\nu5 = 36.6$ |
| $r10 = -1173.4$ | $d10 = 0.54$ | | |
| $r11 = 106.78$ | $d11 = 6.98$ | $n6 = 1.6968$ | $\nu6 = 55.5$ |
| $r12 = 65.80$ | $d12 = 36.31$ | $n7 = 1.5934$ | $\nu7 = 34.8$ |
| $r13 = -209.79$ | $d13 = 17.28$ | | |
| $r14 = 1776.1$ | $d14 = 17.60$ | $n8 = 1.72$ | $\nu8 = 43.7$ |
| $r15 = -93.58$ | $d15 = 6.95$ | $n9 = 1.84666$ | $\nu9 = 23.9$ |
| $r16 = 191.66$ | $d16 = 10.55$ | | |

-continued

Embodiment 2:

r17 = −235.62
         d17 = 12.74    n10 = 1.713     ν10 = 53.9
r18 = 88.54
         d18 = 0.28
r19 = 525.07
         d19 = 13.87    n11 = 1.72      ν11 = 50.3
r20 = −197.00
         r2/r3 = 6.62   D = 152.1   r6/r7 = 0.076
         n8 − n9 = 0.127    r13/r14 = −0.118

Embodiment 3:

f = 100 F/2          Field Angle 92°    B.f. = 175.4
r1 = 248.38
         d1 = 18.60    n1 = 1.72       ν1 = 43.7
r2 = 638.04
         d2 = 0.60
r3 = 110.85
         d3 = 6.96     n2 = 1.72       ν2 = 50.3
r4 = 53.44
         d4 = 23.26
r5 = 1.757
         d5 = 6.52     209.52
                       n3 = 1.757      ν3 = 47.9
r6 = 65.76
         d6 = 9.77
r7 = 405.88
         d7 = 18.61    n4 = 1.61659    ν4 = 36.6
r8 = ∞
         d8 = 1.86
r9 = ∞
         d9 = 25.59    n5 = 1.61659    ν5 = 36.6
r10 = 1901.2
         d10 = 0.47
r11 = 119.03
         d11 = 6.51    n6 = 1.6516     ν6 = 58.7
r12 = 67.02
         d12 = 38.70   n7 = 1.5934     ν7 = 34.8
r13 = −195.93
         d13 = 16.74
r14 = −2189.0
         d14 = 17.63   n8 = 1.757      ν8 = 47.9
r15 = 89.79
         d15 = 6.98    n9 = 1.80518    ν9 = 25.4
r16 = 197.70
         d16 = 10.92
r17 = −321.20
         d17 = 13.01   n10 = 1.713     ν10 = 53.9
r18 = −95.53
         d18 = 0.45
r19 = 495.32
         d19 = 13.94   n11 = 1.6968    ν11 = 55.5
r20 = −217.71
         r2/r3 = 5.76  D = 157.4   r6/r7 = 0.1620
         n8 − n9 = 0.048    r13/r14 = 0.090 wherein the reference symbols r1 through r20 represent radii of curvature on the respective surfaces of said lens elements, the reference symbols d1 through d19 designate thicknesses of the respective lens elements and the airspace therebetween, the reference symbols n1 through n11 denote refractive indices of the respective lens elements and the reference symbols ν1 through ν11 represent Abbe's numbers of the respective lens elements.

Figure 5:
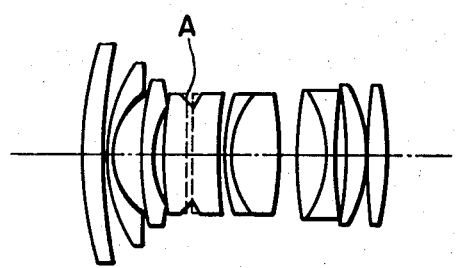
FIG. 5 illustrates a sectional view showing an example of the present invention wherein said fourth lens component is composed only of a single lens element.

In the Embodiments described above, the fourth lens component consists of two lens elements having plane surfaces r8 and r9, which functions to prevent flare due to coma from being produced by lower rays at intermediate angles of field and can improve photographic performance when sais stop is set for large aperture size. Further, these surfaces r8 and r9 may not be flat but have certain adequate radii of curvature for the purpose of favourably correcting aberrations without departing from the scope of the present invention. Furthermore, it is also possible to design said lens system in such a way that both the lens element of the fourth lens component will have different refractive indices and Abbe's numbers without varying the sprit of the present invention though said lens elements have the same refractive indices and Abbe's number in the afore-mentioned Embodiments. In addition, it is possible to design the fourth lens component as such a single lens element as shown in FIG. 5 and machine said lens element as indicated by the symbol A so that said lens element can perform a function equivalent to that of the fixed stop which is described above.

I claim:

1. A large-aperture ultra-wide angle photographic lens system comprising a first positive meniscus lens component, a second negative meniscus lens component, a third negative meniscus lens component, a fourth lens component consisting of at least one single lens element, a fifth positive cemented lens component, a sixth negative cemented lens component, a seventh positive meniscus lens component and a eighth positive lens component, and said lens system satisfying the following conditions:

$$5 < r2/r3 < 7 \tag{1}$$

$$0.05 < r6/r7 < 0.2 \tag{2}$$

$$|r13/r14| < 0.2, \ r13 < 0 \tag{3}$$

$$1.5f < D < 1.7f \tag{4}$$

$$|n8 - n9| < 0.15, \ n9 > n8 \tag{5}$$

wherein the reference symbols r2, r3, r6, r7, r13 and r14 represent radii of curvature on the image side surface of said first lens component, the object side surface of said second lens component, the image side surface of said third lens component, the object side surface of said fourth lens component, the image side surface of said fifth lens component and the object side surface of said sixth lens component, the reference symbol D designates distance as measured from the object side surface of said first lens component to the image side surface of said fifth lens component, the reference symbols n8 and n9 denote refractive indices of the respective object side and image side element of said sixth lens component and the reference symbol f represents focal length of the entire lens system as a whole, and said fourth lens component consisting of two lens elements and having the following numerical data:

f = 100 F/2 Field Angle 92° B.f. = 177.3 r1 = 205.76
         d1 = 18.60    n1 = 1.6393     ν1 = 44.9
r2 = 529.22
         d2 = 0.60
r3 = 101.55
         d3 = 6.28     n2 = 1.734      ν2 = 51.5
r4 = 53.00
         d4 = 23.26
r5 = 228.01
         d5 = 5.63     n3 = 1.7725     ν3 = 49.6
r6 = 62.26
         d6 = 10.70
r7 = 640.49
         d7 = 15.86    n4 = 1.61659    ν4 = 36.6
r8 = ∞
         d8 = 3.26
r9 = ∞
         d9 = 23.26    n5 = 1.61659    ν5 = 36.6
r10 = −2015.4
         d10 = 0.47
r11 = 110.68
         d11 = 6.98    n6 = 1.6968     ν6 = 55.5
r12 = 68.42
         d12 = 36.28   n7 = 1.5934     ν7 = 34.8
r13 = −170.22
         d13 = 17.67
r14 = −1046.6
         d14 = 17.58   n8 = 1.72       ν8 = 43.7
r15 = −88.37

-continued

| | | | |
|---|---|---|---|
| | d15 = 6.98 | n9 = 1.84666 | ν9 = 23.9 |
| r16 = 212.49 | | | |
| | d16 = 10.00 | | |
| r17 = −232.53 | | | |
| | d17 = 13.95 | n10 = 1.713 | ν10 = 53.9 |
| r18 = −88.07 | | | |
| | d18 = 0.47 | | |
| r19 = 459.97 | | | |
| | d19 = 13.95 | n11 = 1.72 | ν11 = 50.3 |
| r20 = −199.85 | | | |
| r2/r3 = 5.21 | D = 151.2 | r6/r7 = 0.097 | |
| n8 − n9 = 0.127 | r13/r14 = 0.163 | | | wherein the reference symbol f represents focal length of the entire lens system as a whole, the reference symbols r1 through r20 designate radii of curvature on the surfaces of the respective lens elements, the reference symbols d1 through d19 denote thicknesses of the respective lens elements and the airspace therebetween, the reference symbols n1 through n11 represent refractive indices of the respective lens elements, the reference symbols ν1 through ν11 designate Abbe's numbers of the respective lens elements, the reference symbol D designates distance as measured from the object side surface of said first lens component to the image side surface of said fifth lens component and reference symbol B.f represents back focal length.

2. A large-aperture ultra-wide angle photographic lens system comprising a first positive meniscus lens component, a second negative meniscus lens component, a third negative meniscus lens component, a fourth lens component consisting of at least one single lens element, a fifth positive cemented lens component, a sixth negative cemented lens component, a seventh positive meniscus lens component and a eighth positive lens component, and said lens system satisfying the following conditions:

$$5 < r2/r3 < 7 \quad (1)$$

$$0.05 < r6/r7 < 0.2 \quad (2)$$

$$|r13/r14| < 0.2, r13 < 0 \quad (3)$$

$$1.5f < D < 1.7f \quad (4)$$

$$|n8 - n9| < 0.15, n9 > n8 \quad (5)$$

wherein the reference symbols r2, r3, r6, r7, r13, and r14 represent radii of curvature on the image side surface of said first lens component, the object side surface of said second lens component, the image side surface of said third lens component, the object side surface of said fourth lens component, the image side surface of said fifth lens component and the object side surface of said sixth lens component, the reference symbol D designates distance as measured from the object side surface of said first lens component to the image side surface of said fifth lens component, the reference symbols n8 and n9 denote refractive indices of the respective object side and image side element of said sixth lens component and the reference symbol f represents focal length of the entire lens system as a whole, and said fourth lens component consisting of two lens elements and having the following numerical data:

| | | | |
|---|---|---|---|
| f = 100 F/2 | | Field Angle 92° | B.f. = 176.9 |
| r1 = 235.55 | | | |
| | d1 = 18.72 | n1 = 1.6393 | ν1 = 44.9 |
| r2 = 678.36 | | | |
| | d2 = 0.72 | | |

-continued

| | | | |
|---|---|---|---|
| r3 = 102.51 | | | |
| | d3 = 6.35 | n2 = 1.734 | ν2 = 51.5 |
| r4 = 55.04 | | | |
| | d4 = 23.35 | | |
| r5 = 234.03 | | | |
| | d5 = 5.72 | n3 = 1.7725 | ν3 = 49.6 |
| r6 = 60.56 | | | |
| | d6 = 10.33 | | |
| r7 = 792.61 | | | |
| | d7 = 16.36 | n4 = 1.61659 | ν4 = 36.6 |
| r8 = ∞ | | | |
| | d8 = 3.33 | | |
| r9 = ∞ | | | |
| | d9 = 23.34 | n5 = 1.61659 | ν5 = 36.6 |
| r10 = −1173.4 | | | |
| | d10 = 0.54 | | |
| r11 = 106.78 | | | |
| | d11 = 6.98 | n6 = 1.6968 | ν6 = 55.5 |
| r12 = 65.80 | | | |
| | d12 = 36.31 | n7 = 1.5934 | ν7 = 34.8 |
| r13 = −209.79 | | | |
| | d13 = 17.28 | | |
| r14 = 1776.1 | | | |
| | d14 = 17.60 | n8 = 1.72 | ν8 = 43.7 |
| r15 = −93.58 | | | |
| | d15 = 6.95 | n9 = 1.84666 | σ9 = 23.9 |
| r16 = 191.66 | | | |
| | d16 = 10.55 | | |
| r17 = −235.62 | | | |
| | d17 = 12.74 | n10 = 1.713 | ν10 = 53.9 |
| r18 = 88.54 | | | |
| | d18 = 0.28 | | |
| r19 = 525.07 | | | |
| | d19 = 13.87 | n11 = 1.72 | ν11 = 50.3 |
| r20 = −197.00 | | | |
| r2/r3 = 6.62 | D = 152.1 | r6/r7 = 0.076 | |
| n8 − n9 = 0.127 | r13/r14 = −0.118 | | | wherein the reference symbol f represents focal length of the entire lens system as a whole, the reference symbols r1 through r20 designate radii of curvature on the surfaces of the respective lens elements, the reference symbols d1 through d19 denote thicknesses of the respective lens elements and the airspace therebetween, the reference symbols n1 through n11 represent refractive indices of the respective lens elements, the reference symbols ν1 through ν11 designate Abbe's numbers of the respective lens elements, the reference symbol D designates distance as measured from the object side surface of said first lens component to the image side surface of said fifth lens component and reference symbol B.F. represents back focal length.

3. A large-aperture ultra-wide angle photographic lens system comprising a first positive meniscus lens component, a second negative meniscus lens component, a third negative meniscus lens component, a fourth lens component consisting of at least one single lens element, a fifth positive cemented lens component, a sixth negative cemented lens component, a seventh positive meniscus lens component and a eighth positive lens component, and said lens system satisfying the following conditions:

$$5 < r2/r3 < 7 \quad (1)$$

$$0.05 < r6/r7 < 0.2 \quad (2)$$

$$|r13/r14| < 0.2, r13 < 0 \quad (3)$$

$$1.5f < D < 1.7f \quad (4)$$

$$|n8 - n9| < 0.15, n9 > n8 \quad (5)$$

wherein the reference symbols r2, r3, r6, r7, r13 and r14 represent radii of curvature on the image side surface of said first lens component, the object side surface of said second lens component, the image side surface of said third lens component, the object side surface of said fourth lens component, the image side surface of said fifth lens component and the object side surface of said sixth lens component, the reference symbol D designated distance as measured from the object side surface of said first lens component to the image side surface of said fifth lens component, the reference symbols n8 and n9 denote refractive indices of the respective object side and image side element of said sixth lens component and the reference symbol f represents focal length of the entire lens system as a whole, and said fourth lens component consisting of two lens elements and having the following numerical data:

| f = 100 F/2 | | Field Angle 92° | B.f. = 175.4 |
|---|---|---|---|
| r1 = 248.38 | | | |
| | d1 = 18.60 | n1 = 1.72 | ν1 = 43.7 |
| r2 = 638.04 | | | |
| | d2 = 0.60 | | |
| r3 = 110.85 | | | |
| | d3 = 6.96 | n2 = 1.72 | ν2 = 50.3 |
| r4 = 53.44 | | | |
| | d4 = 23.26 | | |
| r5 = 209.52 | | | |
| | d5 = 6.52 | n3 = 1.757 | ν3 = 47.9 |
| r6 = 65.76 | | | |
| | d6 = 9.77 | | |
| r7 = 405.88 | | | |
| | d7 = 18.61 | n4 = 1.61659 | ν4 = 36.6 |
| r8 = ∞ | | | |
| | d8 = 1.86 | | |
| r9 = ∞ | | | |
| | d9 = 25.59 | n5 = 1.61659 | ν5 = 36.6 |
| r10 = 1901.2 | | | |
| | d10 = 0.47 | | |
| r11 = 119.03 | | | |

-continued

| | | | |
|---|---|---|---|
| | d11 = 6.51 | n6 = 1.6516 | ν6 = 58.7 |
| r12 = 67.02 | | | |
| | d12 = 38.70 | n7 = 1.5934 | ν7 = 34.8 |
| r13 = −195.93 | | | |
| | d13 = 16.74 | | |
| r14 = −2189.0 | | | |
| | d14 = 17.63 | n8 = 1.757 | ν8 = 47.9 |
| r15 = 89.79 | | | |
| | d15 = 6.98 | n9 = 1.80518 | ν9 = 25.4 |
| r16 = 197.70 | | | |
| | d16 = 10.92 | | |
| r17 = −321.20 | | | |
| | d17 = 13.01 | n10 = 1.713 | ν10 = 53.9 |
| r18 = −95.53 | | | |
| | d18 = 0.45 | | |
| r19 = 495.32 | | | |
| | d19 = 13.94 | n11 = 1.6968 | ν11 = 55.5 |
| r20 = −217.71 | | | |
| r2/r3 = 5.76 | D = 157.4 | r6/r7 = 0.1620 | |
| n8 − n9 = 0.048 | r13/r14 = 0.090 | | | wherein the reference symbol f represents focal length of the entire lens system as a whole, the reference symbols r1 through r20 designate radii of curvature on the surfaces of the respective lens elements, the reference symbols d1 through d19 denote thicknesses of the respective lens elements and the airspace therebetween, the reference symbols n1 through n11 represent refractive indices of the respective lens elements, the reference symbols ν1 through ν11 designate Abbe's numbers of the respective lens elements, the reference symbol D designates distance as measured from the object side surface of said first lens component to the image side surface of said fifth lens component and reference symbol B.f represents back focal length.

* * * * *